Sept. 18, 1934. S. DE ORLOW ET AL 1,973,847
REAR VIEW MIRROR MOUNTING
Filed Dec. 14, 1931
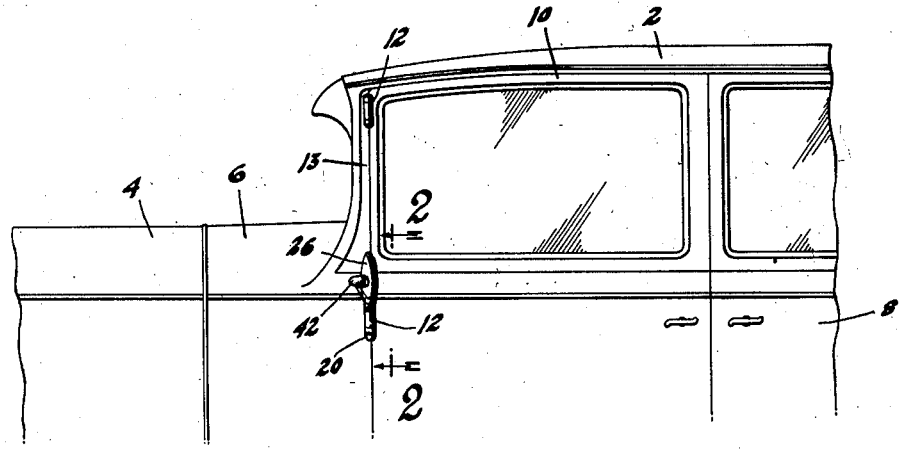
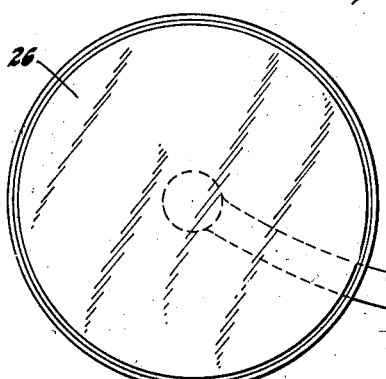
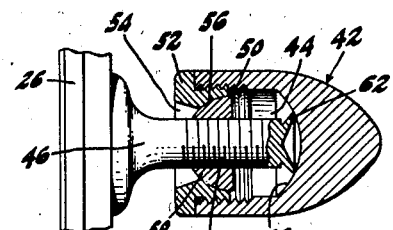
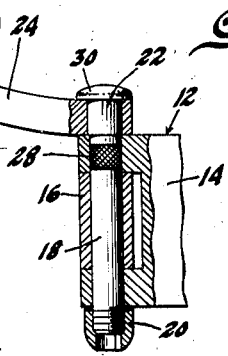
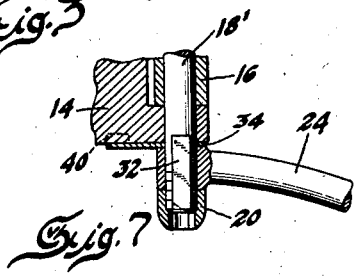
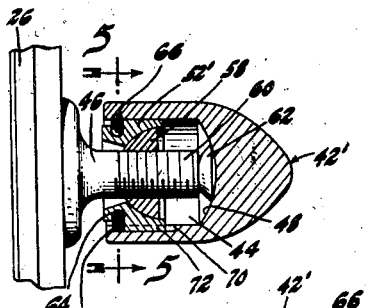
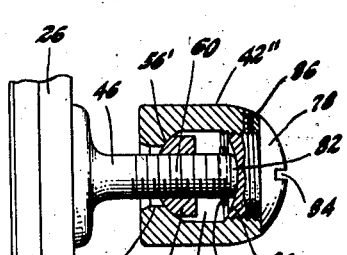
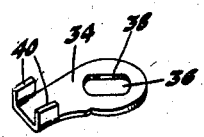
Inventor
Stephen De Orlow
& John W. Lakin
By Blackmore, Spencer & Flint
Attorneys Patented Sept. 18, 1934

1,973,847

UNITED STATES PATENT OFFICE

1,973,847

REAR VIEW MIRROR MOUNTING

Stephen De Orlow and John W. Lakin, Detroit, Mich., assignors to Ternstedt Manufacturing Company, Detroit, Mich., a corporation of Michigan Application December 14, 1931, Serial No. 580,866

2 Claims. (Cl. 45—97)

This invention relates to mirror mountings and has particular reference to the mounting of a rear view mirror positioned at the door of an automotive vehicle.

The improvements relate to the manner of securing the mirror mounting to the hinge of the vehicle door and to the socket between the mirror and the mounting arm. The usual hinge pin of the hinge is replaced by a longer pin which is capable of receiving the arm to support the mirror. The pin has a corrugated portion which conforms to the hinge member secured to the door post, the corrugations being for the purpose of preventing the turning of the pin when the door is opened. As an optional construction, the pin may have flattened portions and a key applied to the hinge member on the door post, the key member having an opening with flattened sides which prevents the turning of the pin.

The details of the socket or connection at the end of the mirror supporting arm with the mirror include a formed portion on the end of the mirror stud which is capable of expanding or being spread out when the mirror stud is screwed into the socket, the spread out portion being for the purpose of preventing the removal of the stud from the socket and to form a friction member to engage a corresponding surface in the socket to hold the mirror in adjusted position.

On the drawing:

Figure 1 is a side view of a portion of an automotive vehicle showing the mirror bracket in position.

Figure 2 is a view taken substantially on the line 2—2 of Figure 1 with parts shown in section.

Figure 3 is a sectional detailed view of the socketed end of the arm showing the mirror stud in position.

Figure 4 is a view similar to Figure 3 of a modified construction.

Figure 5 is a section on the line 5—5 of Figure 4.

Figure 6 is a view similar to Figure 3 of a further modification.

Figure 7 is a detailed view showing a modified form of connecting the mirror bracket to the door post hinge.

Figure 8 is a perspective view of the key member of Figure 7.

Referring to the drawing, the numeral 2 indicates an automotive vehicle having the hood 4, cowl 6, rear door 8, front door 10 connected by the usual hinges 12 to the front door post 13. The hinges 12 comprise the hinge half 14 which is rigidly secured to the door post and the hinge half 16 which is secured to the door. The parts so far described are conventional and per se form no part of the invention.

The hinge 12 is substantially at the middle of the door edge and has the parts 14 and 16 connected by the usual hinge pin which, in the present invention, is replaced by a special type of pin 18 having a nut 20 at one end rigidly to hold the pin in position. The pin 18 has the enlarged portion 22 at its upper end over which there is pressed the end of the arm 24 which supports the mirror 26. The pin 18 is also provided with a knurled or corrugated portion 28 at the place where it meets the hinge half 14. The knurled or corrugated portion 28 will form a more rigid contact with the hinge half 14 than the smoother portion of the pin forms with the hinge part 16. When the door is swung the hinge half 16 will, therefore, turn on the hinge pin instead of the pin 18 turning as a whole. The purpose of this construction, of course, is to prevent the mirror 26 from turning. In addition, the tightening of the nut 20 will pull the head 30 of the pin 18 tightly against the arm 24 more rigidly to hold the parts together.

As an optional construction in holding the pin stationary, the structure of Figures 7 and 8 is provided. In this structure, the pin 18' has the flats 32 on two of its sides. The arm 24 in this instance is mounted at the lower portion of the hinge instead of at the upper portion. A key member 34 fits over the pin 18' and has the opening 36 with the flattened sides 38, the flattened sides conforming to the flats 32 on the pin. Lugs or tongues 40 on the key member 34 fit on opposite sides of the hinge member 14 secured to the body post and prevent the pin from turning when the door is swung.

The end of the arm 24 is formed into a head or socket 42 in which there is received the stud 46 rigidly attached to the rear of the mirror 26. The socket portion 42 is shown at 44 in Figure 3 to be hollow and to have its innermost portion formed into spherical shape as shown at 48. Interiorly at its edge portion, it is threaded as shown at 50 to receive the threaded retaining member 52. The retaining member 52 has an over-sized opening 54 to accommodate the stud 46 and has a spherical bearing surface 56 at its inner portion. A half-ball-shaped member 58 is received in the socket and has a threaded opening adapted to receive the threaded shank 60 of the stud 46, the spherical surface of the member 58 conforming to the spherical surface 56 of the retaining member 52. When the mirror 26 is adjusted, the spherical surfaces of the member 52 and the ball 58 will contact with each other.

The end of the stud 46 is given a special shape as is shown in Figure 3. The end of the stud is shown as spread out as indicated at 62. However, when the stud is first placed inside the socket, the portion 62 has the same diameter as the threaded portion 58. When the mirror is screwed into the socket, the portion 62 will spread to the shape shown in Figure 3. The spread out portion is, of course, considerably larger than the threaded opening in the ball 58 and will, therefore, prevent the withdrawal of the stud. The engagement of the spread out portion 62 with the spherical portion 48, and the engagement of the ball 58 with the surface 56 will serve as a frictional engagement rigidly to hold the mirror in various adjusted positions.

Referring to Figure 4, an optional construction to accomplish the same purpose as the structure of Figure 3 is shown. In this figure, the retaining member 52' is not threaded but has a groove 64 formed therein while the socket 42' has a groove 66 formed on the interior thereof. A split spring or wire 68 fits into the two grooves and rigidly holds the member 52' in position. A key-way 70 in the socket 42' and a key 72 on the member 52' prevent the relative intermovement of the socket 42' and the retaining member 52'.

In the optional construction shown in Figure 6, the socket or head 42'' has the interiorly extending portion 74 through which the threaded portion 60 passes. The ball 58 is the same as in the species of Figures 3 and 4 and cooperates with a correspondingly shaped surface 56' in the head 42''. The end of the threaded member 60, instead of being formed as at 62 in the species of Figures 3 and 4, has an opening therethrough in which a pin 76 is rigidly mounted. The pin 76 prevents the withdrawal of the stud 46 from the socket. A threaded retaining member 78 is screwed into the rear end of the head 42'' and has a rounded surface 80 engaged by the rounded end 82 of the stud 46 to form a frictional retaining surface. The retaining member 78 is suitably shaped as at 84 to allow the application of a suitable tool and a set screw 86 rigidly holds the retaining member 78 in position.

We claim:

1. In a mounting for the rear view mirror of an automotive vehicle, an arm extending from the body of the vehicle, a socket on the end of the arm, a stud secured to the mirror and extending into the socket, a spherical member screwthreaded on said stud, a retaining member secured in the socket around the stud and having a surface cooperating with the spherical surface of said member, said retaining member having an over-sized opening to permit adjustment of the stud and mirror, and means on the end of the stud to prevent the withdrawal of the stud from the spherical member.

2. In a mounting for the rear view mirror of an automotive vehicle, an arm extending from the body of the vehicle, a socket on the end of the arm, a stud secured to the mirror and extending into the socket, a spherical member screwthreaded on said stud, a retaining member secured in the socket around the stud and having a surface cooperating with the spherical surface of said member, said retaining member having an over-sized opening to permit adjustment of the stud and mirror, and an expanded portion on the end of the stud to prevent the withdrawal of the stud from the socket.

STEPHEN DE ORLOW.
JOHN W. LAKIN.